United States Patent
Putraya et al.

(10) Patent No.: US 9,936,131 B2
(45) Date of Patent: Apr. 3, 2018

(54) ROBUST TWO DIMENSIONAL PANORAMA GENERATION USING LIGHT FIELD CAMERA CAPTURE

(71) Applicant: Nokia Technologies Oy, Espoo (FI)

(72) Inventors: Gururaj Gopal Putraya, Bangalore (IN); Basavaraja S V, Bangalore (IN); Mithun Uliyar, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 730 days.

(21) Appl. No.: 13/942,992

(22) Filed: Jul. 16, 2013

(65) Prior Publication Data
US 2014/0022337 A1    Jan. 23, 2014

(30) Foreign Application Priority Data

Jul. 18, 2012 (IN) .......................... 2900/CHE/2012

(51) Int. Cl.
*H04N 5/232* (2006.01)
*G06T 3/40* (2006.01)

(52) U.S. Cl.
CPC ....... *H04N 5/23238* (2013.01); *G06T 3/4038* (2013.01); *G06T 2200/21* (2013.01); *G06T 2207/10052* (2013.01)

(58) Field of Classification Search
None
See application file for complete search history.

(56) References Cited

U.S. PATENT DOCUMENTS

| 5,550,937 | A  | *  | 8/1996  | Bell ....................... G06T 3/0081 |
| | | | | 382/278 |
| 5,915,033 | A  | *  | 6/1999  | Tanigawa ............... G01C 3/085 |
| | | | | 348/349 |
| 6,157,747 | A  | *  | 12/2000 | Szeliski ................. G06K 9/209 |
| | | | | 345/419 |
| 7,710,463 | B2 | *  | 5/2010  | Foote .................... G06T 3/4038 |
| | | | | 348/218.1 |
| 2006/0195475 | A1 | | 8/2006 | Logan et al. |
| 2010/0318467 | A1 | * | 12/2010 | Porter ..................... G06K 9/34 |
| | | | | 705/51 |
| 2011/0052093 | A1 | | 3/2011 | Porter |

(Continued)

OTHER PUBLICATIONS

Szeliski et al., "Creating Full View Panoramic Image Mosaics and Environment Maps," Aug. 1997, Inproceedings Computer Graphics (SIGGRAPH'97 Proceedings), p. 251-258.*

(Continued)

*Primary Examiner* — Edemio Navas, Jr.
(74) *Attorney, Agent, or Firm* — Alston & Bird LLP

(57) ABSTRACT

A method, apparatus, and computer program product for generating a seamless and error-free panorama image using a selective set of views from a multi-view image from each of the several captured light field (LF) images. The method identifies the view and corresponding image for each captured LF image which has the same or closely located center of projection with the views of neighboring LF images. Image registration and warping techniques are applied across the images and the parallax error is calculated which indicates the closeness of their center of projections. The view from each LF captured image with minimal parallax error is selected and stitched together with the other views identified as having minimal parallax error.

20 Claims, 8 Drawing Sheets

(56) References Cited

U.S. PATENT DOCUMENTS

2012/0294549 A1* 11/2012 Doepke ............... G06T 3/4038
 382/294
2012/0307092 A1* 12/2012 Kotani ............... H04N 5/2226
 348/218.1

OTHER PUBLICATIONS

Shum et al., "Construction of Panoramic Mosaics with Global and Local Alignment," Feb. 2000, International Journal of Computer Vision.*
Fehn et al., "Creation of High-Resolution Video Panoramas of Sport Events," 2006, Proceedings of the Eight IEEE International Symposium on Multimedia (ISM'06).*
Debevec et al., Image-Based Modeling and Rendering, Course 15, SIGGRAPH 98 (1998), p. 1-4 and 110.*
European Search Report received for corresponding EP Application No. 13176809.5, dated Mar. 21, 2014, 7 pages.
Li et al., "Stereo Reconstruction from Multiperspective Panoramas", Pattern Analysis and Machine Intelligence, vol. 26, No. 1, pp. 45-62.
Aliage et al., "Plenoptic Stitching: A Scalable Method for Reconstructing 3D Interactive Walkthroughs", Computer Graphics Proceedings, Annual Conference Series, Los Angeles, CA, Aug. 12, 2001, pp. 443-450.
Hugin tutorial—Stitching murals using mosaic mode [online] Retrieved from the Internet: –URL: http://hugin.sourceforge.net/tutorials/Mosaic-mode/en.shtml>. (dated Sep. 2010) 7 pages.
Lytro Light Field Science | Lytro Blog [online] [retrieved May 9, 2012]. Retrieved from the Internet: <URL: http://blog_lytro.com/news/lytro-light-field-camera-living-pictures-video/>. (dated Jun. 22, 2011) 44 pages.
The Stanford Multi-Cameera Array [online] Retrieved from the Internet: <URL: http://graphics.stanford.edu/projects/array/>. (dated Jan. 21, 2011) 3 pages.
Bahmutov, G. et al., *Depth Enhanced Panoramas* (undated) 8 pages.
Birklbauer, C. et al., *Panorama Light-Field Imaging*, SIGGRAPH 2012 (Aug. 2012) 1 page.
Debevec, P. et al., *Image-Based Modeling and Rendering*, Course 15, SIGGRAPH 98 (1998) pp. 1-1 through 1-4, and 1-10.
Levoy, M. et al., *Light Field Rendering*, Proc. ACM SIGGRAPH'96 (1996) 12 pages.
Stack, D., *Panorama Stitching*, [online] Retrieved from the Internet: <URL: http://dpbestflow.org/image-editing/panorama-stitching>. (Feb. 27, 2012) 20 pages.
Wang, L. et al., *Parallax-free intra-operative X-ray image stitching*, Medical Image Analysis, 14 (2010) 674-686.
Decision to Grant for European Application No. 13176809.5 dated Apr. 21, 2016, 2 pages.

* cited by examiner

Let a1, b1, c1 be the 3 views of LF image – 1

Let a2, b2, c2 be the 3 views of LF image – 2

.
.
.

Let an, bn, cn be the 3 views of LF image - n

ROBUST TWO DIMENSIONAL PANORAMA GENERATION USING LIGHT FIELD CAMERA CAPTURE

TECHNOLOGICAL FIELD

The various embodiments of the invention are related to the field of computational photography, computer vision and image signal processing, specifically relating to the generation of a panoramic image of a scene from a set of input images of a scene taken at various angles with a light-field camera.

BACKGROUND

Panorama is the process of combining multiple photographic images with overlapping fields of view to produce a high-resolution image. In the ideal input image capture for panorama scene generation, all of the images share the same center of projection (see FIG. 1), and hence there is no parallax error when the images are registered across, warped and stitched together. But with hand held cameras, it is highly difficult to make sure there is a common center of projection for all the images due to the unstable hand holding the camera. It is also more convenient for a user to capture images with some amount of image translation apart from rotation. That is, input images with small amounts of translation end up with different centers of projection. The output panorama image suffers from errors due to parallax between captured images.

One solution would minimize the problem of errors caused due to parallax in panorama generation, perhaps by intelligently identifying the input images with the same or similar center of projection (even when they are captured by handheld cameras). This may be accomplished with the use of light field camera image capture. A light field (LF) camera, also called a plenoptic camera, is a camera that can capture 4-dimensional (4D) light field information about a scene. For minimal mis-registration in the final output, the center of projection of all of the individual images needs to be same or as close as possible, otherwise the parallax error in the captured individual images will show up as mis-registration in the final output.

In the case of captured images from LF cameras, for each captured image one can obtain multiple view angled images which have different centers of projection. In that instance, a method is needed to identify and select the views from each of the images with the same or closely related center of projection by which one can produce the parallax error-minimized/free panoramas.

BRIEF SUMMARY

In a first embodiment, a method for constructing a panorama from multiple angled images comprises capturing N LF images from which multi-view images can be generated, each at different angles, and each LF image overlapping with its adjacent image by a preferred twenty percent (20%). The method further comprises selecting a view of a first multi-view image i as a reference for that image; registering and warping each view of the next image with the selected reference view; and determining parallax error of each view as a difference between the warped image and the reference image. The method continues by entering the parallax error in trellis Tile Ti between the reference view of image i and the multiple views of image(i+1).

The method of one embodiment also comprises processing all views of all captured images such that the trellis contains a Tile for each image i to (N−1) and performing dynamic programming optimization with path tracking across difference Tiles. This leads to finding global minimal error from the dynamic programming trellis and backtracking to find different views in each image which give minimal parallax error. The method may then include stitching different views identified with minimal parallax error into a panorama and outputting a multi-view panorama image with minimal parallax error.

In an alternative embodiment, an apparatus is provided that comprises at least a processor and an associated memory, said memory containing computer coded instructions which, when executed by a processor, cause the apparatus to capture N LF images from which multi-view images can be generated, each at different angles, and each overlapping its adjacent LF image by a preferred twenty percent (20%). Once captured, the apparatus may select a view of a first multi-view image i as a reference for that image, then register and warp each view of the first image with the selected reference view. The processor, executing the instructions from memory, causes the apparatus to determine the parallax error of each view as a difference between the warped image and the reference image, then enter the parallax error in trellis Tile Ti between the reference view of image i and the multiple views of image(i+1).

The apparatus of one embodiment is further caused to process all views of all captured images such that the trellis contains a Tile for each image i to (N−1). Further instructions may cause the apparatus to perform dynamic programming optimization with path tracking across difference Tiles. Then the apparatus may find global minimal error from dynamic programming trellis and backtracking to find different views in each image which give minimal parallax error. Finally, the apparatus of one embodiment is caused to stitch different views identified with minimal parallax error into a panorama and output a multi-view panorama image with minimal parallax error.

Another embodiment is a computer program product comprising computer instructions residing in a non-transitory computer-readable medium, the instructions when executed by a processor cause the apparatus to perform capturing N LF images from which multi-view images can be generated, each at different angles, and each overlapping its adjacent LF image by a preferred twenty percent (20%). After the images are captured, the computer instructions perform selecting a view of a first multi-view image i as a reference for that image, registering and warping each view of the first image with the selected reference view and determining the parallax error of each view as a difference between the warped image and the reference image. The instructions further cause entering the parallax error in trellis Tile Ti between the reference view of image i and the multiple views of image(i+1).

The computer program of one embodiment further causes processing all views of all captured images such that the trellis contains a Tile for each image i to (N−1), performing dynamic programming optimization with path tracking across difference Tiles, and finding global minimal error from the dynamic programming trellis and backtracking to find different views in each image which give minimal parallax error. The computer program may finally cause stitching different views identified with minimal parallax error into a panorama, and outputting a multi-view panorama image with minimal parallax error.

In yet another embodiment, an apparatus is provided that comprises means for capturing N lightfield images from which multi-view images can be generated, each at different angles, and each overlapping its adjacent image by a preferred twenty percent (20%), means for selecting a view of a first multi-view image i as a reference for that image, and means for registering and warping each view of the first image with the selected reference view. The apparatus may further comprise means for determining parallax error of each view as a difference between the warped image and the reference image, and means for entering the parallax error in trellis Tile Ti between the reference view of image i and the multiple views of image(i+1).

The apparatus of one embodiment may further comprise means for processing all views of all captured images such that the trellis contains a Tile for each image i to (N−1), means for performing dynamic programming optimization with path tracking across difference Tiles, and means for finding global minimal error from dynamic programming trellis and backtracking to find different views in each image which give minimal parallax error. The apparatus may finally comprise means for stitching different views identified with minimal parallax error into a panorama, and means for outputting a multi-view panorama image with minimal parallax error.

BRIEF DESCRIPTION OF THE SEVERAL VIEWS OF THE DRAWINGS

Figure 1:
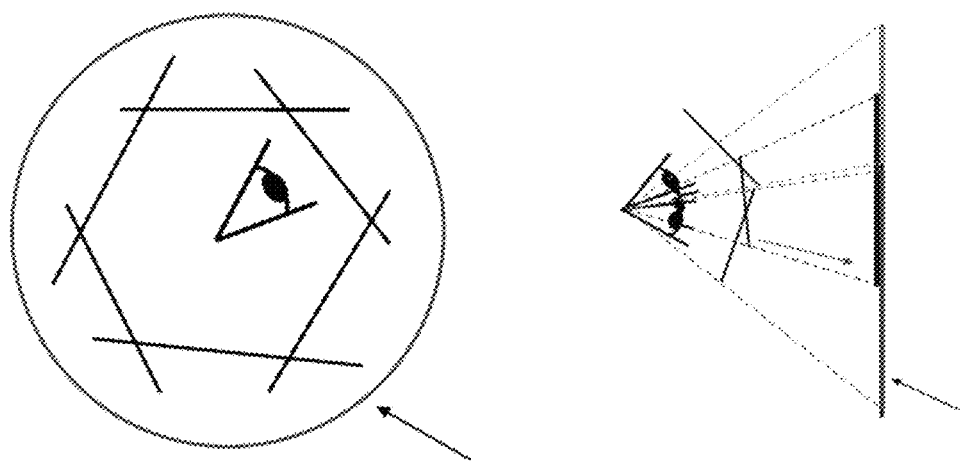
Figure 2:
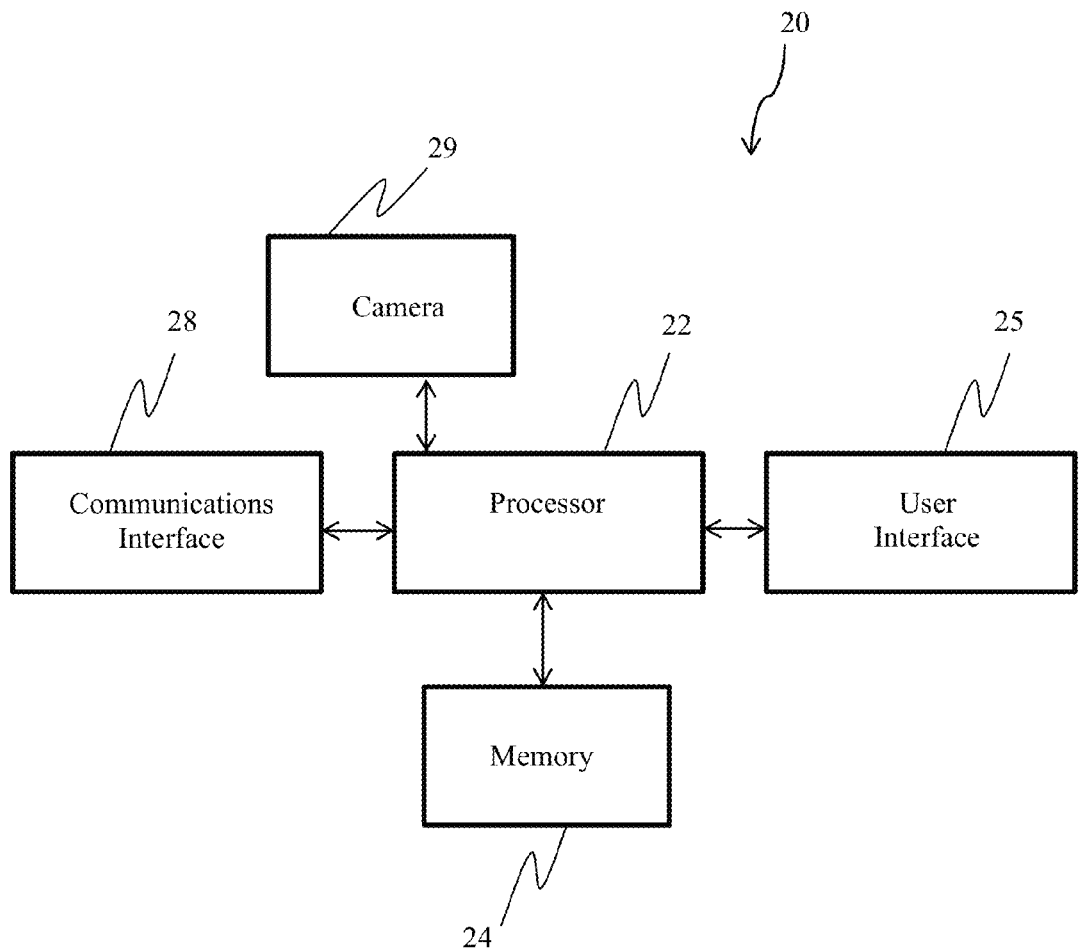
Figure 3:
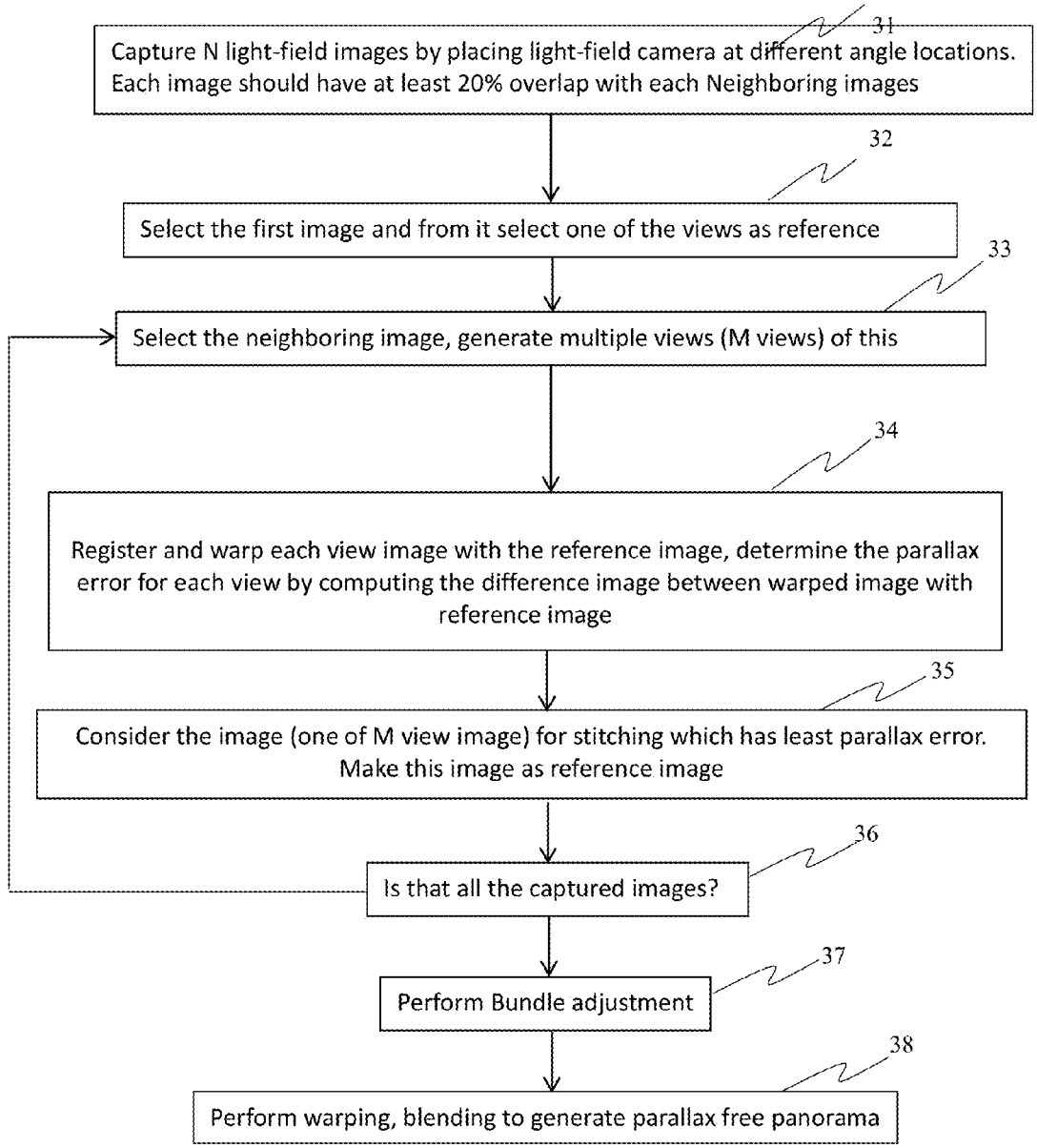
Figure 4:
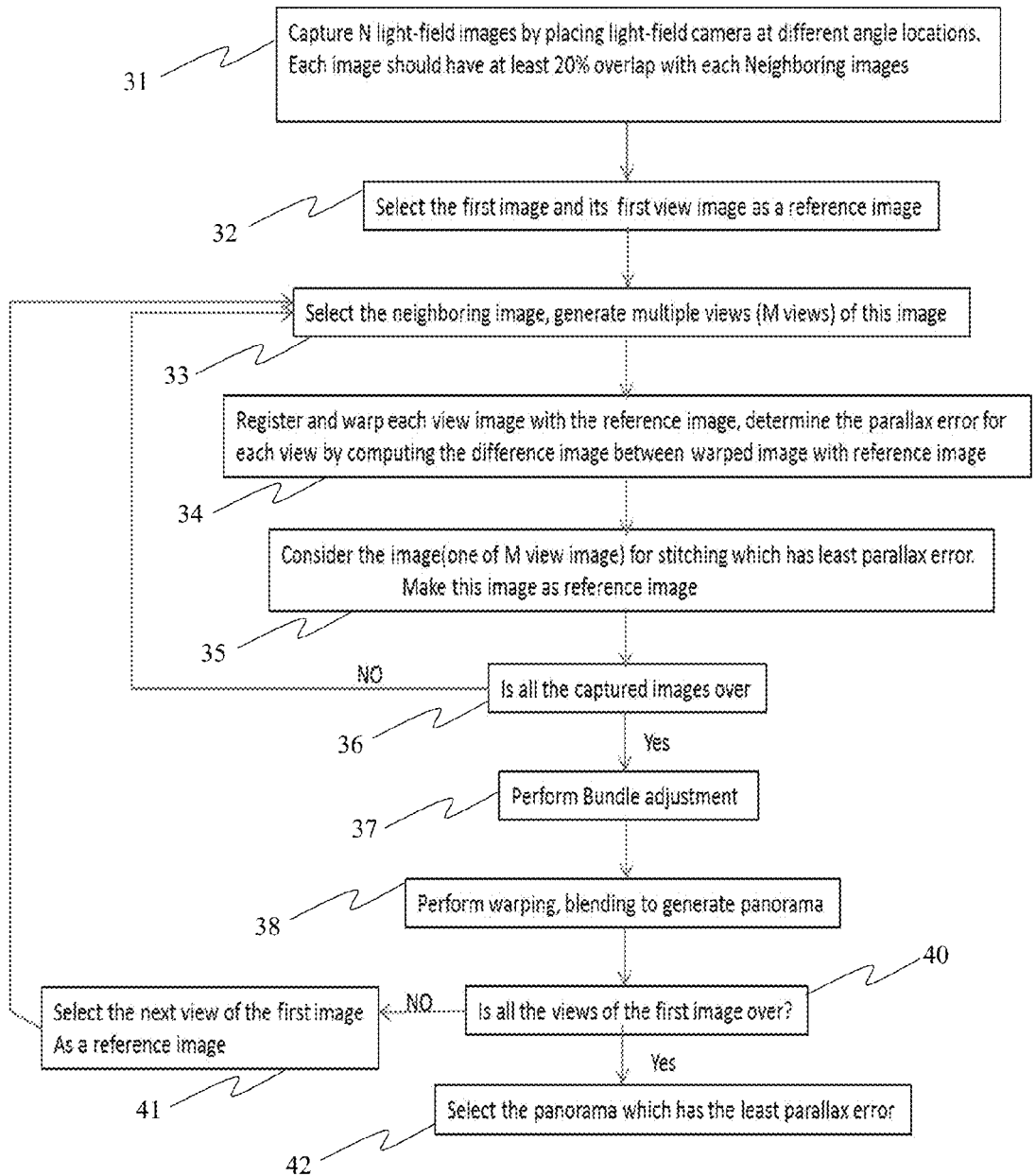
Figure 5A:
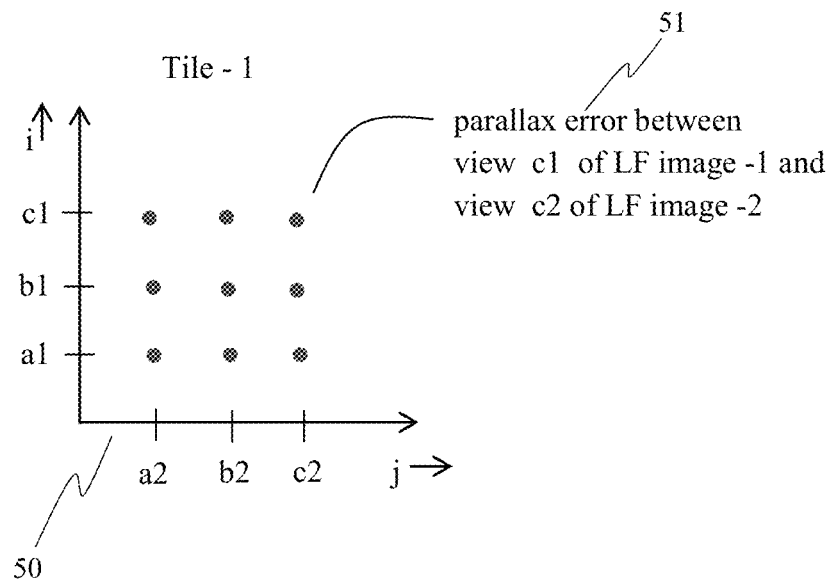
Figure 5B:
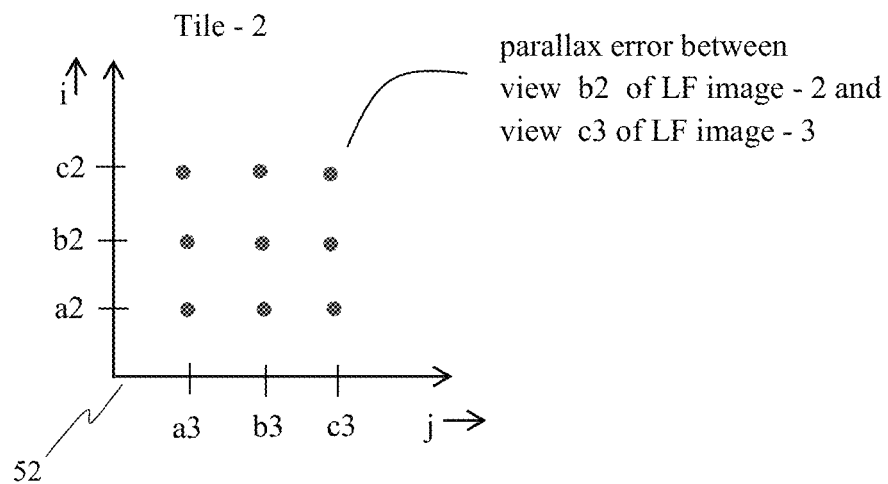
Figure 5C:
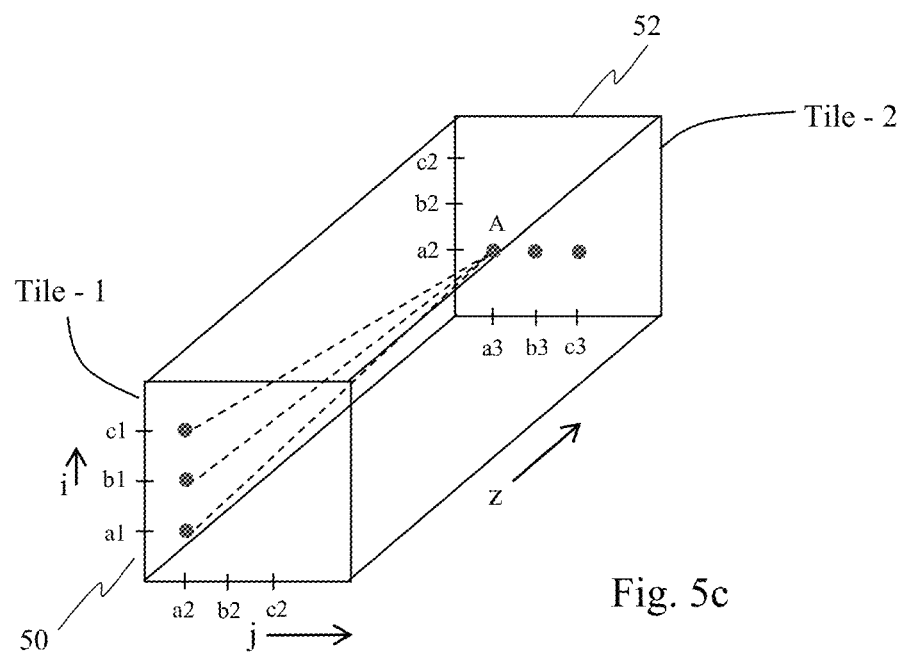
Figure 5D:
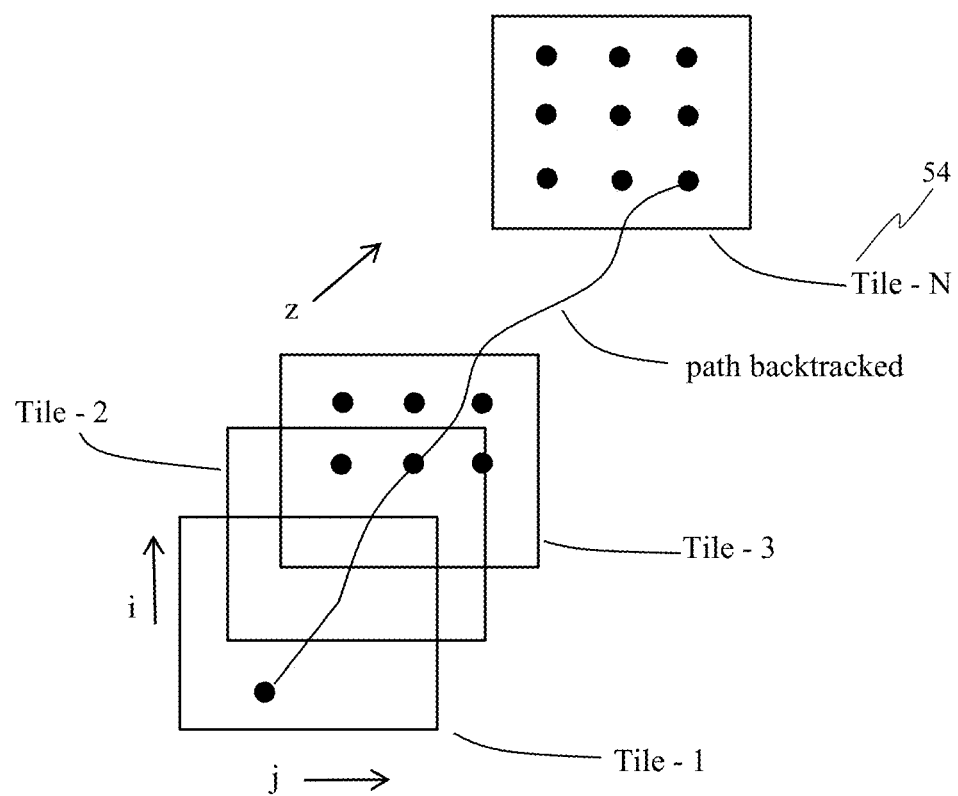
Figure 6:
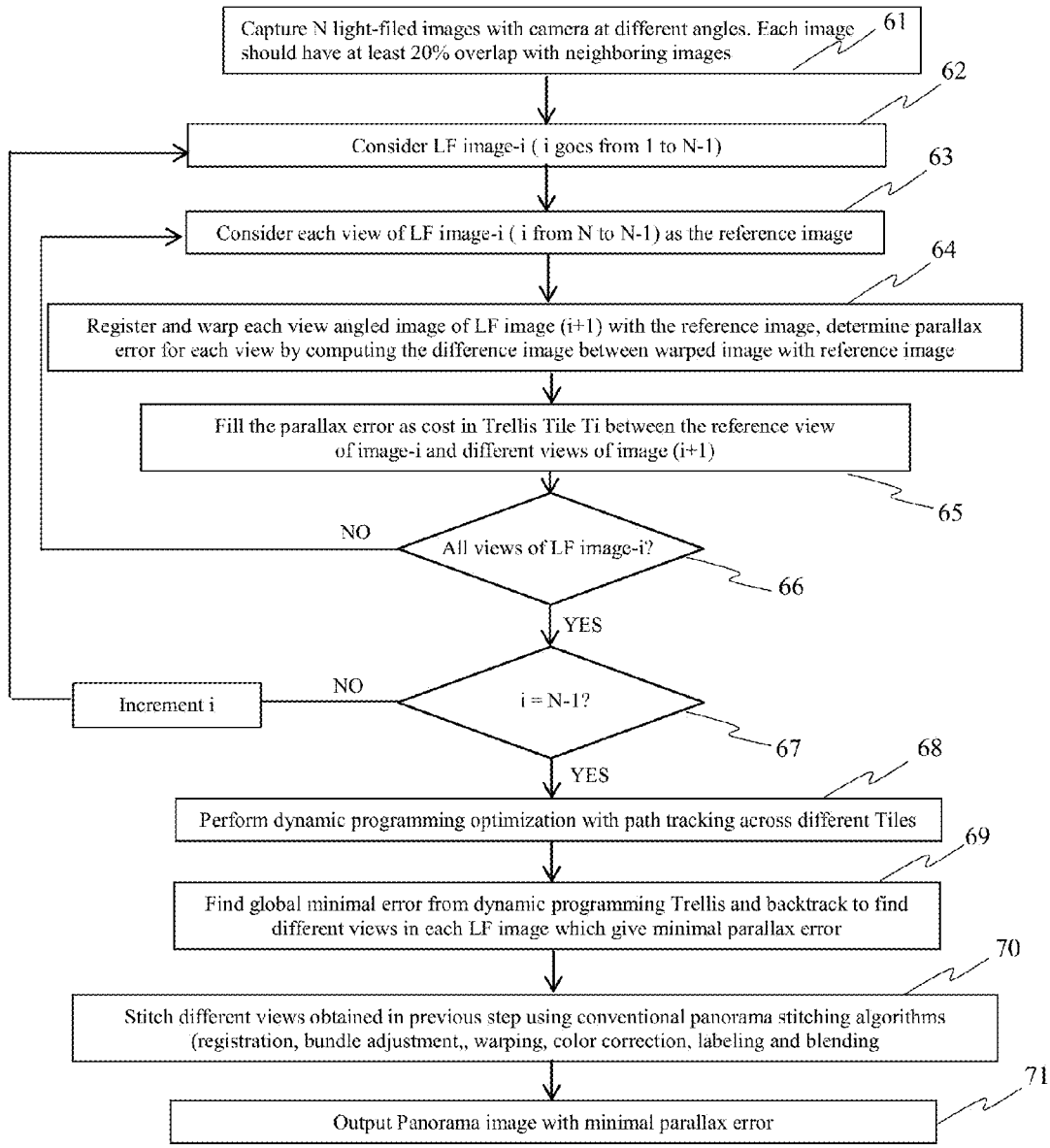

Having thus described certain embodiments of the invention in general terms, reference will now be made to the accompanying drawings, which are not necessarily drawn to scale, and wherein:

FIG. 1 is a schematic diagram of panorama capture;

FIG. 2 is a block diagram of an apparatus that may be specifically configured in accordance with an example embodiment of the present invention;

FIG. 3 is a flow diagram of a process for panorama generation in accordance with an example embodiment of the present invention;

FIG. 4 is a flow diagram of an alternative process for panorama generation in accordance with another embodiment of the present invention;

FIG. 5a is a Tile diagram of a calculation according to an embodiment of the invention;

FIG. 5b is a Tile diagram of a calculation according to an embodiment of the invention;

FIG. 5c is a trellis diagram of a calculation according to an embodiment of the invention;

FIG. 5d is a Tile diagram backtracking parallax error through several images; and FIG. 6 is a flow diagram of a process embodiment according to the invention.

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

Referring now to FIG. 2, an apparatus 20 that may be embodied by or otherwise associated with a mobile terminal (e.g., a cellular phone, a personal digital assistant (PDA), a smartphone, a tablet computer or the like) may include or otherwise be in communication with a processor 22, a memory device 24, a communication interface 28, a user interface 25, and a camera 29.

In some example embodiments, the processor 22 (and/or co-processors or any other processing circuitry assisting or otherwise associated with the processor) may be in communication with the memory device 24 via a bus for passing information among components of the apparatus 20. The memory device 24 may include, for example, one or more non-transitory volatile and/or non-volatile memories. In other words, for example, the memory device 24 may be an electronic storage device (e.g., a computer readable storage medium) comprising gates configured to store data (e.g., bits) that may be retrievable by a machine (e.g., a computing device like the processor). The memory device 24 may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device 24 could be configured to store instructions for execution by the processor 22.

The apparatus 20 may, in some embodiments, be embodied by a mobile terminal. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading. In the embodiment in which the apparatus 20 is embodied as a mobile terminal, the processor may be embodied by the processor of the mobile terminal.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 28 may be any means such as a device or circuitry embodied in either hardware or a combination of hardware and software that is configured to receive and/or transmit data from/to a network and/or any other device or module in communication with the apparatus 20. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In order to support multiple active connections simultaneously, such as in conjunction with a digital super directional array (DSDA) device, the communications interface of one embodiment may include a plurality of cellular radios, such as a plurality of radio front ends and a plurality of base band chains. In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some example embodiments, such as instances in which the apparatus 20 is embodied by a mobile terminal, the apparatus may include a user interface 25 that may, in turn, be in communication with the processor 22 to receive an indication of a user input and/or to cause provision of an audible, visual, mechanical or other output to the user. As such, the user interface 25 may include, for example, a keyboard, a mouse, a joystick, a display, a touch screen(s), touch areas, soft keys, a microphone, a speaker, or other input/output mechanisms. Alternatively or additionally, the processor may comprise user interface circuitry configured to control at least some functions of one or more user interface elements such as, for example, a speaker, ringer, microphone, display, and/or the like. The processor and/or user interface circuitry comprising the processor may be configured to control one or more functions of one or more user interface elements through computer program instructions (e.g., software and/or firmware) stored on a memory accessible to the processor (e.g., memory device and/or the like).

The camera 29 may be a light field camera, also called a plenoptic camera. One method of light field capture is by using a micro-lens array between the main-lens and the sensor; similarly, it can also be generated by an array of cameras placed close to each other. A light field camera takes a four dimensional image of a scene. Post-processing of the captured images in the sensor permits the camera system to refocus an image on a computer. Depth information can be extracted from the several images of the same scene, providing the information that permits image parts that are not in focus to be corrected. In alternative embodiments, the light field camera may also function as a stand-alone device not associated with a mobile terminal 20. In case of captured images from LF cameras, for each captured image one can obtain multiple view angled images which have different centers of projection.

In the various embodiments of the invention, N sets of images from an LF camera are captured (with M views for each set at various angles) at N camera angles. Processing the images, the method of an example embodiment of the invention intelligently identifies the images with the same or closest center of projection. Using the selected set of N images from N sets, which have the same or closest center of projection, a panorama image that has little or no parallax error is constructed.

A flow diagram of a first embodiment for constructing a panorama is shown in FIG. 3. It begins with capturing N light-field images 31 with a light field camera by placing the light-field camera at different angle locations relative to a reference point. The images are received by the processor 22. Each image should have at least a predefined amount of overlap, such as a preferred twenty (20) percent overlap, with each neighboring image. One of the views of the first image, which comprises M views, is selected by the processor 22 to be the reference 32. The neighboring image is selected and M views of that image are generated 33, such as by processor 22.

In a captured LF image, depending on the method of capture, the processor 22 can generate an output 4-dimensional function $L(x,y,u,v)$ where $(x,y)$ are the spatial co-ordinates and $(u,v)$ are the angular co-ordinates (unlike a conventional capture system which will generate only $O(x,y)$ (i.e, only spatial co-ordinates). The angular co-ordinates $(u,v)$ are the ones which generate the multiple views. Depending on the mode of capture, the various images of $(u,v)$ need to be reconstructed. The number of views from a captured image depends on the designed camera system as it trade's-off with spatial resolution. Examples are provided in Levoy and Hanrahan, "Light Field Rendering." Stanford University (Computer Science Department) (1996), which is incorporated herein by reference in its entirety (especially FIGS. 1 and 6 of the paper where (s,t) of the paper is (x,y) above).

Each view image is registered and warped with the reference image 34, such as with the processor 22. Registration is an operation in which the perspectivity of two adjacent images (e.g., image pairs) are calculated and embedded in a matrix. Based on this matrix the two images are warped to get the images aligned in the required manifold. In calculating the registration matrix, a correspondence is found by the processor 22 between the corner points in the two adjacent images in the overlap region. These correspondences will help in finding the elements of the matrix and hence will get the final registration matrix.

Warping is a way of manipulating an input image so that it matches the output image in the closest possible way. The manipulation from input to output image in the case of a panorama is determined by a registration matrix. The parallax error for each view is determined by the processor 22 by computing the difference image between the warped image and the reference image. The image that will be stitched into a panorama will be the one with the least parallax error 35. This becomes the reference image. Once all of the captured images have been processed 36, a bundle adjustment is performed 37, such as by processor 22.

In panorama generation, a registration matrix is found by the processor 22 using adjacent image pairs. Hence if there are 4 images, then there are 3 registration matrices (e.g., between 1-2, 2-3, 3-4). However using just these matrices and stitching the whole image might lead to artifacts, such as gaps being present in the output image. Bundle adjustment can correct for such artifacts and also corrects for global rotation in the set of captured images. This is done after the registration matrices of the image pairs are calculated and before the warping operation. Finally, the stitched image is warped and blended by the processor 22 to generate a parallax free (or minimized) panorama 38.

The method of FIG. 3 is a relatively (compared to other embodiments) faster process of calculating the output panorama. However this method may not always provide a globally minimal parallax error for the given set of N captured LF images with each image having M angled view images.

A second embodiment is illustrated in FIG. 4. This process duplicates the operations of the process of FIG. 3 up through the bundle adjustment and the warping and blending 38 to generate the panorama. However, the entire process repeats 40 using each view of the first image as a reference image 41. This means that a new panorama will be generated by the processor 22 for each reference view that is processed. Once all of the panoramas are generated, the one with the least parallax error is selected by the processor 22 for output 42.

The process of FIG. 4 produces a generally better result compared to that of FIG. 3. The result will be a globally minimal parallax error for the given set of N images from the LF camera with each image having M angled view images. However, the FIG. 4 process may be a more computationally intensive way of finding the angled image view for each LF captured image that produces a minimal parallax error. It may therefore be slower to yield the result compared to the first embodiment because so much computational effort is involved.

In a further embodiment, a globally minimum parallax error is found using a dynamic programming (DP) optimization technique. A 3D trellis is formed by the processor 22 using the method shown in FIG. 6. In the method of FIG. 6, if there are 3 views for each of the captured LF images, then the first building block 50, 'Tile-1' of the trellis, is formed by the processor 22 as shown in FIG. 5a. Each element 51 of the trellis is the parallax error between each view of image-1 (the first LF image) and image-2 (the $2^{nd}$ LF image which is the neighbor of image-1).

Parallax error is determined by the processor 22 as the sum of the absolute difference between the warped image and the reference image in the overlap region. A "Tile" is a term adopted for this explanation. A 2-dimensional matrix 50 is formed with one of the axes holding all the views of one LF image and the other axis having the multiple views of the neighboring LF image. For example in Tile-1, LF image 1 has views (a1, b1, c1); similarly LF image 2 (which is the neighboring LF image of LF image 1) has views (a2, b2, c2). The matrix 50 of Tile-1 is filled by the processor 22 as the sum of the absolute difference between the warped image of a view of LF image 1 and a view of LF image 2. For example: Tile-1 (1,1) is formed by the processor 22 as the sum of absolute difference between warped image of a1 (to a2) with a2 in the overlap region. See FIG. 5a.

Similarly the second Tile 52 (Tile-2) is formed by the processor 22 between various views of image-2 and image-3, as shown in FIG. 5b. The cost of each element of Tile-2 (where "cost" is a synonym for parallax error) is Tile-2$(i,j)$=parallax-error$(i,j)$+min{cost of Tile-1(for all $j$'s,$i$)}

Tile-2 52 is formed with parallax error between the views of next neighboring LF images added with the minimum of the parallax error in the previous Tile 50 (for all j's, i). Hence Tile-2 is an accumulated parallax error from the previous Tile.

Referring to FIG. 5c, in general the above can be extended as

Tile-$N(i,j)$=parallax-error$(i,j)$+min{cost of Tile-$(N-1)$ (for all $j$'s,$i$)}

Tile-N will have the accumulated parallax error from all the previous Tiles. If the minimum of all the values in the 2-dimensional matrix of Tile-N is found, the minimum accumulated parallax error (which is nothing but (I, J)) is revealed.

The global minimal cost of the trellis is found by

Min{Tile-$N(i,j)$}

The location of the minimal cost is given as $(I,J)$=arg min{Tile-$N(i,j)$}

Referring to FIG. 5d, Tile-N 54 would have the accumulated parallax-error from the first image to the Nth image. The above expression finds the minimum value in Tile-N which has the minimum accumulated error. Finding this gives (I, J) and back-tracking the trellis from (I, J) will allow the processor 22 to give a view for each LF image that is later stitched together.

The views of each LF image which resulted in the global minimum parallax error is determined by the processor 22 backtracking from (I, J) at Tile-N 54 that has the minimal accumulated global cost. For example, if the processor 22 back-tracks from that co-ordinate of (I, J) a view for each LF image from each Tile (i.e, N, N−1, . . . 1) is obtained which contributed to the global accumulated value. This is shown in FIG. 5d. Once the views of each LF image which results in minimum global parallax error is determined, the panorama can be generated by the processor 22 using the computed views. The flow diagram of the above method is shown in FIG. 6.

The process begins much as those described earlier (FIGS. 3, 4). N light field images are captured 61 by the camera and received in the processor 22, preferably with at least a predefined amount of overlap, such as a preferred 20% overlap, with neighboring images. Selecting a sequence of LF images (1 to N-1) 62, each view of each image is treated as a reference view 63. Each view of each image is registered and warped 64 by the processor 22 with the reference view and the parallax error for each view being computed by the processor as the difference image between the warped image and the reference image.

The processor 22 then fills a sequence of Tiles in the parallax error trellis 65 where each Tile comprises the reference view of image-i and the several views of image (i+1). These operations are iterated for each view of an LF image 66, and again for each view of each image from 1 to N-1 67.

The processor 22 of this embodiment then performs dynamic programming optimization 68 with path tracking across different Tiles. The processor 22 may then determine the global minimal error 69 from the dynamic programming trellis and backtrack to find the different views in each LF image that produce minimal parallax error. This part of the process is performed until there is a selected view for each of N images. The different views are stitched by the processor 22 using conventional panorama stitching algorithms 70, that is, using registration, bundle adjustment, warping, color correction, labeling and blending. The output 71 is a panorama image with minimal parallax error.

The process of FIG. 6 produces a globally minimal parallax error for the given set of N, LF captured images with each image having M angled image views. Although this method may be slower compared to the first method, it may be more accurate and result in a nearly seamless panorama output.

In the above method the cost is taken to be the accumulated parallax error from the previous Tiles, however one can add other terms in the cost like field of view, distortion in each view of the LF image, etc. to the parallax error. In case of multiple items for cost calculation, the processor 22 can take a weighted average of all the terms. For example, it could be (w1*accumulated parallax-error+w2*field of view+w3*distortion in the views)/(w1+w2+w3).

As described above, FIGS. 3, 4 and 6 are flowcharts of a method, apparatus and program product according to example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions.

For example, one or more of the procedures described above may be embodied by computer program instructions. In this regard, the computer program instructions which embody the procedures described above may be stored by a memory device 24 of an apparatus 20 employing an embodiment of the present invention and executed by a processor 22 in the apparatus. As will be appreciated, any such computer program instructions may be loaded onto a computer or other programmable apparatus (e.g., hardware) to produce a machine, such that the resulting computer or other programmable apparatus embody a mechanism for implementing the functions specified in the flowchart blocks.

These computer program instructions may also be stored in a non-transitory computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 3, 4 and 6, when executed, convert a computer or processing circuitry into a particular machine configured to perform an example embodiment of the present invention.

Accordingly, the operations of FIGS. 3, 4 and 6 define an algorithm for configuring a computer or processing circuitry (e.g., processor) to perform an example embodiment. In some cases, a general purpose computer may be configured to perform the functions shown in FIGS. 3, 4 and 6 (e.g., via configuration of the processor), thereby transforming the general purpose computer into a particular machine configured to perform an example embodiment.

Accordingly, blocks of the flowcharts support combinations of means for performing the specified functions, combinations of operations for performing the specified functions and program instructions for performing the specified functions. Indeed, an apparatus of one embodiment includes means, such as a camera 29, e.g., a light field camera, for the like, for capturing images as shown in block 31 of FIGS. 3 and 4 and block 61 of FIG. 6, and means, such as the processor 22 or the like, for performing the operations of the other blocks of FIGS. 3, 4 and 6. It will also be understood that one or more blocks of the flowcharts, and combinations of blocks in the flowcharts, can be implemented by special purpose hardware-based computer systems which perform the specified functions or operations, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

We claim:
1. A method comprising:
receiving N light field (LF) images from which multi-view images can be generated at different angles, and each LF image overlapping its adjacent LF image;
selecting a view of a first multi-view image of LF image i as a reference view;

registering view images of the adjacent LF image with the selected reference view by calculating perspectivity of pairs of each view of the adjacent LF image and the reference view image and embedding each perspectivity in a registration matrix, wherein registering view images comprises finding a correspondence between corner points of a respective view of the adjacent LF image and the reference view image in an overlap region;

warping view images of the adjacent LF image based on the registration matrix in order to align the view images;

determining parallax error for each view image of the adjacent LF image as a sum of an absolute difference between each warped view image of the adjacent LF image and the reference view in the overlap region; and storing the parallax error between the reference view of LF image i and each view of the adjacent LF image (i+1) in a three dimensional trellis.

2. The method of claim 1 wherein the image overlap is at least twenty percent.

3. The method of claim 1 wherein the parallax error is entered in the trellis with an accumulated parallax error from each of the N LF images.

4. The method of any of claim 3 further comprising:
processing views of captured images such that the trellis contains a Tile for LF images i to (N−1).

5. The method of claim 4 further comprising:
performing dynamic programming optimization with path tracking across different Tiles.

6. The method of claim 5 further comprising:
finding global minimal error from the dynamic programming trellis and backtracking to find different views in images which give minimal parallax error.

7. The method of claim 6 further comprising:
stitching different views identified with minimal parallax error into a panorama.

8. The method of claim 7 further comprising:
outputting a multi-view panorama image with minimal parallax error.

9. An apparatus comprising:
at least a processor and an associated memory, said memory containing computer coded instructions which, when executed by the processor, cause the apparatus to:
receive N light field (LF) images from which multi-view images can be generated, each at different angles, and which overlap its adjacent LF image;
select a view of a first multi-view image of LF image i as a reference view;
register view images of the adjacent LF image with the selected reference view by calculating perspectivity of pairs of each view of the adjacent LF image and the reference view image and embedding each perspectivity in a registration matrix; warp view images of the adjacent LF image based on the registration matrix in order to align the view images, wherein register view images comprises find a correspondence between corner points of a respective view of the adjacent LF image and the reference view image in an overlap region;
determine parallax error for each view image of the adjacent LF image and the reference view image as a sum of an absolute difference between each warped view image of the adjacent LF image and the reference view in an overlap region; and
store the parallax error between the reference view of LF image i and each view of the adjacent LF image(i+1) in a three dimensional trellis.

10. The apparatus of claim 9 wherein the image overlap is twenty percent.

11. The apparatus of claim 9, wherein the parallax error is entered in the trellis with an accumulated parallax error from each of the N LF images.

12. The apparatus of claim 11 wherein the processor, executing computer coded instructions, causes the apparatus to:
process all views of all captured images such that the trellis contains a Tile for each LF image i to (N−1).

13. The apparatus of claim 12 wherein the processor, executing computer coded instructions, causes the apparatus to:
perform dynamic programming optimization with path tracking across difference Tiles.

14. The apparatus of claim 13 wherein the processor, executing computer coded instructions, causes the apparatus to:
find global minimal error from the dynamic programming trellis and backtracking to find different views in each image which give minimal parallax error.

15. The apparatus of claim 14 wherein the processor, executing computer coded instructions, causes the apparatus to:
stitch different views identified with minimal parallax error into a panorama.

16. The apparatus of claim 15 wherein the processor, executing computer coded instructions, causes the apparatus to:
output a multi-view panorama image with minimal parallax error.

17. A computer program product comprising computer instructions residing in a non-transitory computer-readable medium, said instructions when executed by a processor cause the apparatus to perform:
receive N light field (LF) images from which multi-view images can be generated, each at different angles, and each LF image overlapping its adjacent LF image;
select a view of a first multi-view image of LF image i as a reference view;
register view images of the first image of the adjacent LF image with the selected reference view by calculating perspectivity of pairs of each view image of the adjacent LF image and the reference view image and embedding each perspectivity in a registration matrix; warp view images of the adjacent LF image based on the registration matrix in order to align the view images, wherein register view images comprises find a correspondence between corner points of a respective view of the adjacent LF image and the reference view image in an overlap region;
determine parallax error for each view image of the adjacent LF image and the reference view image as a sum of an absolute difference between each warped view image of the adjacent LF image and the reference view in an overlap region; and
store the parallax error between the reference view of LF image i and each view of the adjacent LF image(i+1) in a three dimensional trellis.

18. The computer program product of claim 17 wherein the image overlap is twenty percent.

19. The computer program product of claim 17 wherein the parallax error is entered in the trellis with an accumulated parallax error from each of the N LF images.

20. The computer program product of any of claim 19 wherein said instructions when executed by a processor further cause the apparatus to perform:

process all views of all captured images such that the trellis contains a Tile for each LF image i to (N−1).

* * * * *